W. M. WARDEN, J. MUIRHEAD & J. L. CLARK.
GALVANIC-BATTERY.
No. 175,884.                    Patented April 11, 1876.
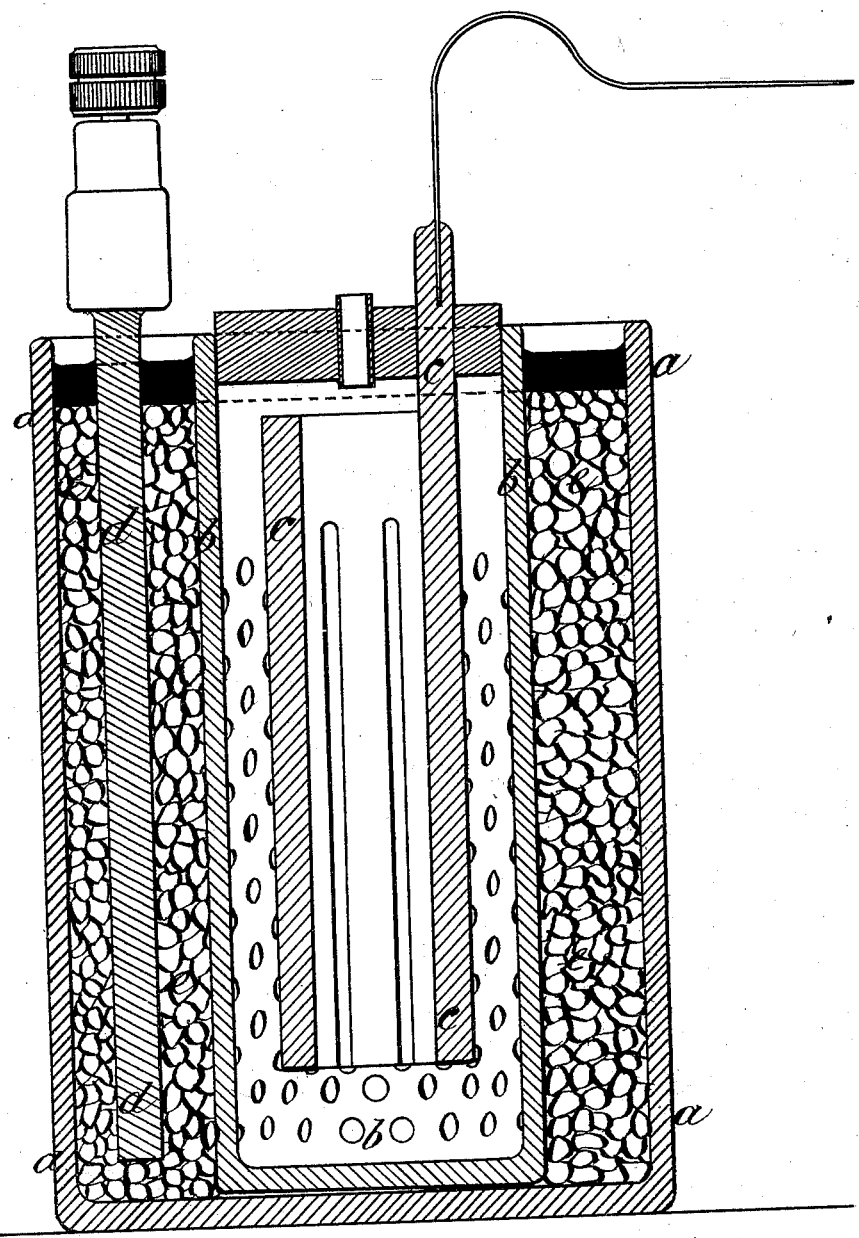
WITNESSES,
INVENTORS,
WILLIAM MARSTON, WARDEN
JOHN, MUIRHEAD
JOSIAH LATIMER, CLARK.
BY THEIR ATTORNEY

UNITED STATES PATENT OFFICE.

WILLIAM M. WARDEN, JOHN MUIRHEAD, AND JOSIAH L. CLARK, OF WESTMINSTER, ENGLAND.

IMPROVEMENT IN GALVANIC BATTERIES.

Specification forming part of Letters Patent No. 175,884, dated April 11, 1876; application filed February 26, 1876.

*To all whom it may concern:*

Be it known that we, WILLIAM MARSTON WARDEN, JOHN MUIRHEAD, and JOSIAH LATIMER CLARK, all of 29 Regent street, Westminster, England, subjects of the Queen of Great Britain, have invented or discovered new and useful Improvements in Galvanic Batteries; and we, the said WILLIAM MARSTON WARDEN, JOHN MUIRHEAD, and JOSIAH LATIMER CLARK, do hereby declare the nature of the said invention, and in what manner the same is to be performed, to be particularly described and ascertained in and by the following statement thereof, that is to say—

This invention has for its object improvements in galvanic batteries, and relates to those batteries in which the negative element is surrounded with manganese.

The manganese-batteries now in use have a porous, earthenware, canvas-cloth, or other similar cell or diaphragm between the two electrodes, which causes great increase of the internal resistance when the battery has been charged for some time, in consequence of the formation of insoluble oxysalts of zinc within and upon the body of the porous material. The gradual accumulation of these salts of zinc bursts or disintegrates the porous diaphragm, or otherwise impedes and destroys the action of the battery. Another defect in the existing forms of manganese-batteries is the rapid polarization of the negative, or carbon, electrode when the battery is worked hard, in consequence of its surface not being sufficiently extensive. We employ, instead of the porous earthenware or other similar diaphragm, a cell or diaphragm of vitreous earthenware or other non-porous material perforated with holes. We prefer to use a cell of cylindrical form. Outside this cell we place a carbon or platinum plate, surrounded by graphite and manganese, (pyrolusite,) each in small pieces or lumps, and intermixed, the whole being contained in an outer cell of glass, stoneware, or other suitable material. Inside the perforated cell we place a zinc pole. This we prefer to cast in the form of a hollow cylinder, with a slit or slits up the side. Or, the zinc may be in the form of a solid rod or bar. The exciting reagent we prefer to use is chloride of ammonium in a saturated solution. The carbon or platinum negative electrode we platinize. Sometimes, also, we platinize the graphite lumps surrounding the negative electrode. The two poles of the battery are provided with suitable terminals, or connections.

By the use of the perforated non-porous diaphragm the action of the battery is not impeded by the formation of the oxysalts of zinc, and the cell is not liable to the bursting and disintegrating that takes place in the existing forms of batteries where a porous materal is used.

When the carbon-lumps are platinized we prefer to use platinum as the negative electrode. By placing the negative electrode surrounded by the carbon and manganese lumps outside the perforated cell, a greater depolarizing mass is presented to the zinc, and at the same time the resistance of the negative electrode is diminished. The zinc being placed inside the cell, and being cast in cylindrical form, permits of its being brought close to the inner surface of the perforated cell, (thus diminishing the resistance of the battery,) and being hollow and slit at the side, a large quantity of solution can be held.

There is advantage in the use of a perforated non-porous cell, even if the zinc plate be placed outside and the carbon inside, but the arrangement previously described is preferred.

In the annexed drawing is shown a vertical section of a battery-cell constructed according to our invention. *a* is the outer cell. *b* is the inner perforated non-porous cell. *c* is the zinc element contained within the cell *b*. *d* is the negative element, of either graphite or platinum, surrounded by a mixture of graphite and manganese in lumps about the size of peas, and in equal parts. This mixture, marked *e*, as the drawing shows, is filled in all around the cell *b*. We prefer to platinize the graphite and manganese lumps, and also the surface of the platinum or graphite plate around which the lumps are packed. Over the filling, marked *e*, is placed a cover, rendered tight by bituminous cement, to prevent evaporation. When required for use, the battery is filled with a saturated solution of sal-ammoniac. The zinc element is attached to a cork which fits the mouth of the cell $b$ and closes it, so as to prevent rapid evaporation.

We claim—

1. A perforated stoneware or non-porous diaphragm in manganese batteries, substantially as described.

2. The arrangement of the zinc element within the inner cell, and the manganese and carbon in the space between the outer and inner cells, substantially as described.

WM. M. WARDEN.
JOHN MUIRHEAD.
J. LATIMER CLARK.

Witnesses:
G. F. WARREN,
WILMER M. HARRIS,
*Both of No. 17 Gracechurch street, London.*